(12) United States Patent
Kato et al.

(10) Patent No.: US 7,474,165 B2
(45) Date of Patent: Jan. 6, 2009

(54) OSCILLATING DEVICE, OPTICAL DEFLECTOR AND OPTICAL INSTRUMENT USING THE SAME

(75) Inventors: Takahisa Kato, Tokyo (JP); Yukio Furukawa, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 11/603,058

(22) Filed: Nov. 22, 2006

(65) Prior Publication Data

US 2007/0115072 A1 May 24, 2007

(30) Foreign Application Priority Data

Nov. 22, 2005 (JP) ............................ 2005-337074

(51) Int. Cl.
*G02B 26/08* (2006.01)
(52) U.S. Cl. ..................... 331/176; 359/224; 359/199; 310/333
(58) Field of Classification Search ................. 359/224, 359/199; 331/176; 310/333
See application file for complete search history.

(56) References Cited

U.S. PATENT DOCUMENTS

| 4,859,846 | A | 8/1989 | Burrer ........................ 250/234 |
| 5,047,630 | A | 9/1991 | Confer et al. ............... 250/235 |
| 6,365,478 | B1 * | 4/2002 | Block et al. ................ 438/312 |
| 6,803,843 | B2 | 10/2004 | Kato et al. .................... 335/78 |
| 6,850,349 | B2 | 2/2005 | Miyajima et al. ........... 359/199 |
| 6,924,915 | B2 | 8/2005 | Hirose et al. ................ 359/224 |
| 2006/0198006 | A1 * | 9/2006 | Kato et al. ................... 359/224 |
| 2007/0041070 | A1 | 2/2007 | Ishibe et al. ................ 359/216 |
| 2007/0071055 | A1 | 3/2007 | Fujii ....................... 372/50.11 |

FOREIGN PATENT DOCUMENTS

| JP | 9-197334 | 7/1997 |
| JP | 11-149056 | 6/1999 |
| JP | 2004-69731 | 3/2004 |
| WO | 2005/063613 | 7/2005 |

* cited by examiner

*Primary Examiner*—Joseph Chang
(74) *Attorney, Agent, or Firm*—Fitzpatrick, Cella, Harper & Scinto

(57) ABSTRACT

Disclosed is an oscillating device that includes an oscillating system having a plurality of oscillation movable elements, a plurality of elastically supporting portions connected to the oscillation movable elements, and a supporting member for supporting a predetermined portion of the plurality of resiliently supporting portions so that predetermined oscillation movable element or elements are resiliently supported for oscillation about a predetermined oscillation axis, the device further including a driving circuit for driving the oscillating system and a temperature adjusting element for adjusting temperature of the resiliently supporting portions, wherein the oscillating system has a plurality of natural oscillation modes of different frequencies, and wherein the driving circuit functions to oscillate the predetermined movable element about the predetermined oscillation axis, in different natural oscillation modes simultaneously.

13 Claims, 11 Drawing Sheets

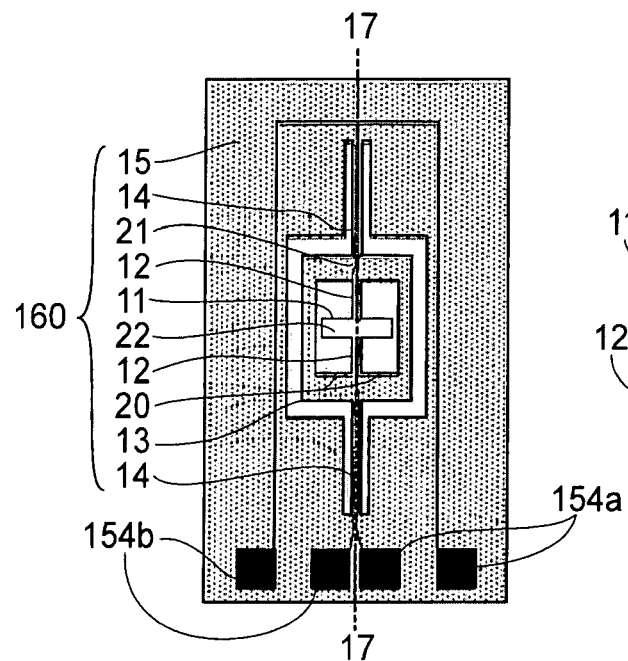
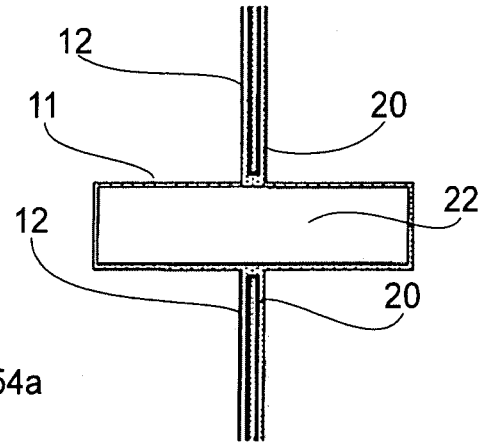
FIG.5A  FIG.5B
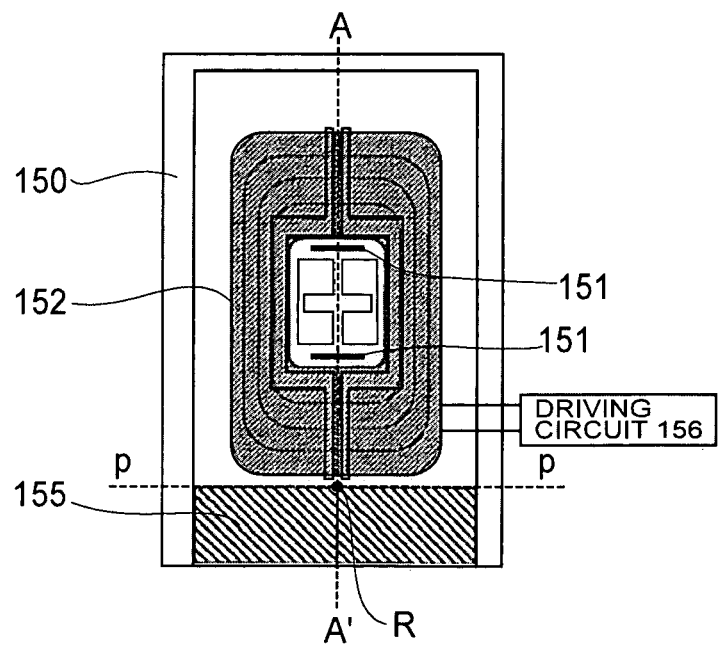
FIG.5C

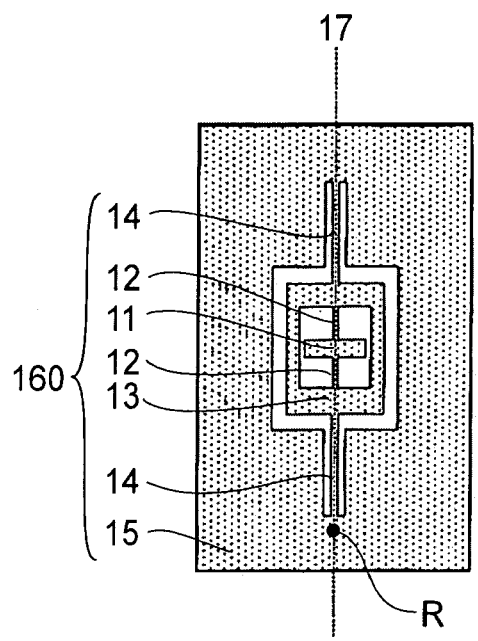 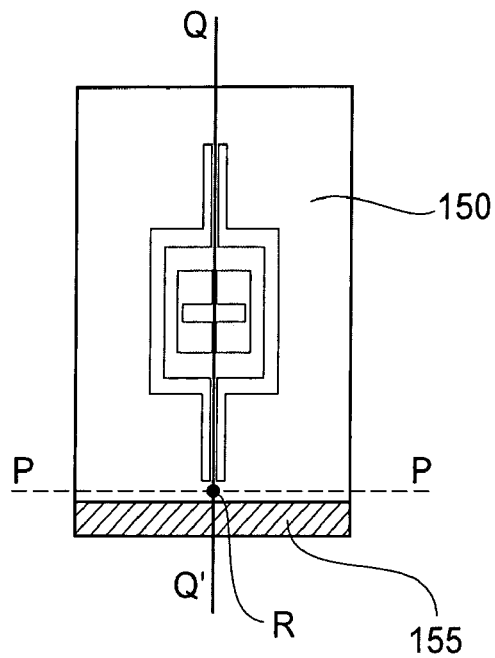
FIG.15A    FIG.15B
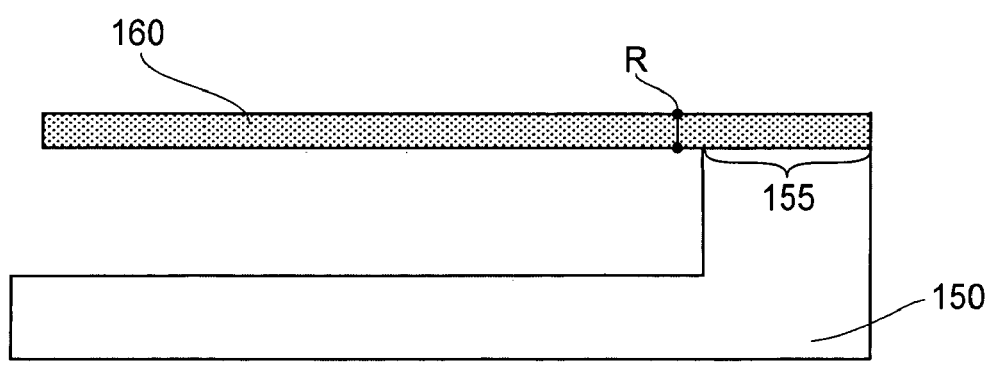
FIG.16

OSCILLATING DEVICE, OPTICAL DEFLECTOR AND OPTICAL INSTRUMENT USING THE SAME

FIELD OF THE INVENTION AND RELATED ART

This invention relates to an oscillating device having a plurality of oscillation movable elements being resiliently supported for oscillating motion. In another aspect, the invention concerns an optical deflector using such oscillating device and an optical instrument such as an image forming apparatus using the same. Optical deflectors according to the present invention may preferably be incorporated into projection display devices for projecting an image through deflective scan of light, or image forming apparatuses such as a laser beam printer or a digital copying machine having an electrophotographic process, for example.

For such optical deflectors, various proposals have been made with regard to optical scanning systems or devices for deflecting light by sine vibration of a reflection surface. Here, as compared with optical scanning systems having a rotary polygonal mirror (polygon mirror), optical scanning systems having an optical deflector arranged to perform sine vibration based on resonance phenomenon have advantageous features as follows. That is, optical deflectors can be made very small in size; the power consumption is low; and optical deflectors made of Si monocrystal through semiconductor manufacturing processes are theoretically very low in metal fatigue and have good durability.

In such optical deflectors based on resonance phenomenon, in some applications it is desirable to drive the deflector at a constant frequency. Hence, a few proposals have been made to maintain the resonance frequency constant against temperature changes in the environment.

One proposal is that an oscillating system having a movable plate resiliently supported by a pair of resilient torsion beams is fixed to a member that has a thermal expansion coefficient larger than that of the plate, such that stresses are produced in the resilient torsion beams in a direction to cancel any changes in the rigidity which may occur with a temperature rise (see Patent Document 1).

Another proposal uses an oscillating system having a movable plate resiliently supported by a pair of resilient torsion beams, the oscillating system being provided with a heat generating portion for temperature adjustment of the resilient torsion beams. Hence, even if the environment temperature changes, the temperature of the resilient torsion beams can be maintained constant for stabilization of the resonance frequency (see Patent Document 2).

On the other hand, in relation to optical deflectors using resonance phenomenon, there is a technique in which two or more resonance modes in the rotational oscillation direction are excited simultaneously to perform optical scanning other than the sinuous-wave optical scan. This technique is used in an optical deflector wherein two or more resonance modes about the same central axis are excited simultaneously to perform triangular-wave-like approximately constant angular-speed scan (see patent documents 3 and 4). FIG. 19 is a block diagram for explaining an optical deflector in which, as disclosed in these patent documents, two resonance modes are excited simultaneously to perform triangular-wave-like approximately constant angular-speed scan.

In FIG. 19, an optical deflector 1012 comprises a first movable element 1014, a second movable element 1016, a first torsion spring 1018 for coupling and resiliently supporting them, and a second torsion spring 1020 for resiliently supporting the second movable element 1016 and a mechanical ground surface 1023. All of these components are torsionally oscillated by driving means 1030 about a torsional axis 1026. The first movable element 1014 has a reflection surface for deflecting light, and it deflectively scan the light from a light source through torsion oscillation of the first movable element 1014.

With regard to the torsion oscillation about the torsional axis 1026, the optical deflector 1012 has a first-order natural oscillation mode that provides a reference frequency as well as a second-order natural oscillation mode that provides a frequency of approximately threefold of the reference frequency. The driving means 1030 drives the optical deflector 1012 in accordance with two frequencies, that is, the first-order natural oscillation mode frequency and the frequency threefold of and having the same phase as the former. Thus, the optical deflector 1012 is torsionally oscillated in accordance with the first-order natural oscillation mode and the second-order natural oscillation mode, simultaneously. As a result, the displacement angle of deflective scan of the light reflected by the first movable element 1014 corresponds to superposition of these two oscillation modes, such that it changes like triangular waves, not sine waves. Consequently, as compared with a case where the displacement angle is sine-wave like, there is a wider region in which the angular speed of deflection scan becomes approximately constant. Hence, the proportion of the effectively usable region in the whole range of deflective scan can be made larger.

On the other hand, the first movable element 1014 has a displacement detecting reflection surface 1015, at a rear surface remote from the deflective scan reflection surface thereof. Displacement detecting means 1032 functions to project light onto the displacement detecting reflection surface 1015, and it detects the reflection light, by which the displacement angle of the first movable element 1014 is detected. A displacement angle detection signal is transmitted by a signal line 1034. Then, through a bandpass filter circuit 1036, only the frequency component of the first-order natural oscillation mode is sent to a first signal line 1038 and a second signal line 1040. The signal from the first signal line 1038 is supplied to a multiplier 1042 by which the signal is converted into a signal having a frequency of threefold of the original. To this end, the multiplier 1042 comprises a phase adjusting input 1054 and an amplitude adjusting input 1055. Through these two inputs, the phase and largest amplitude of the output signal from the multiplier 1042 can be adjusted such that the displacement of deflective scan of the first movable element 1014, detected by the displacement detecting means 1032, properly has an approximately triangular wave shape.

Further, the signal from the multiplier 1042 is applied to an input of an adder 1046. The adder 1046 functions to add the signal from the multiplier 1042 and the frequency signal of the first-order natural oscillation mode supplied through the second signal line 1040 and an automatic gain control circuit 1060, to produce a driving signal for the optical deflector 1012. The driving signal is transmitted through a signal line 1048 to the driving circuit 1050, such that the driving means 1023 is driven in accordance with a combined waveform of the first-order natural oscillation mode and a frequency signal of threefold of it.

The automatic gain control circuit 1060 comprises a peak detecting circuit 1056, a difference amplification circuit 1061, a preset amplitude 1063, an amplifier 1062, and a gain control circuit 1064. The second signal line 1040 is branched into to signal lines 1040a and 1040b. The signal from the signal line 1040a is used to detect, through the difference amplifying circuit 1061, the difference between the largest amplitude as detected by said peak detecting circuit and the preset amplitude 1063 which is an amplitude value having been set beforehand. This differential signal is transmitted to the amplifier 1062 that controls the gain control circuit 1064, and it is used to control the gain control circuit 1064 so that the signal from the signal line 1040b obtains the same gain as of the preset amplitude 1063.

[Patent Documents]
1: U.S. Pat. No. 6,850,349
2: Japanese Laid-Open Application No. 2004-69731
3: U.S. Pat. No. 4,859,846
4: U.S. Pat. No. 5,047,630

SUMMARY OF THE INVENTION

In optical deflectors wherein deflective scan is carried out while two or more natural oscillation modes are superposed, such as described hereinbefore, each frequency must be adjusted very precisely. In addition to this, unless all the natural oscillation modes are kept stable at desired frequencies, respectively, not only the scan frequency but also the scan waveform would be deformed.

It is an object of the present invention to provide a unique and improved oscillating device, an optical deflector and/or an optical instrument having the same, by which the inconveniences described above can be avoided or reduced.

In accordance with an aspect of the present invention, there is provided an oscillating device, comprising: an oscillating system having a plurality of oscillation movable elements, a plurality of elastically supporting portions connected to said plurality of oscillation movable elements, and a supporting member for supporting a portion of said plurality of resiliently supporting portions; a coil for applying a torque to at least one of said plurality of oscillation movable elements; a driving circuit for supplying a driving signal to said coil; and a temperature adjusting element for adjusting temperature of at least one of said resiliently supporting portions; wherein said oscillating system has a reference oscillation mode corresponding to a natural oscillation mode at a reference frequency, and a second natural oscillation mode of a frequency n-fold of the reference frequency, where n is an integer; and wherein said driving circuit applies, to said coil, a driving signal of the reference oscillation mode and a driving signal of the second natural oscillation mode so as to excite the reference oscillation mode and the second natural oscillation mode simultaneously.

In accordance with another aspect of the present invention, there is provided an oscillating device that includes an oscillating system having a plurality of oscillation movable elements, a plurality of elastically supporting portions connected to the oscillation movable elements, and a supporting member for supporting a predetermined portion of the plurality of resiliently supporting portions so that predetermined oscillation movable element or elements are resiliently supported for oscillation about a predetermined oscillation axis, the device further including a driving circuit for driving the oscillating system and a temperature adjusting element for adjusting temperature of the resiliently supporting portions, wherein the oscillating system has a plurality of natural oscillation modes of different frequencies, and wherein the driving circuit functions to oscillate the predetermined movable element about the predetermined oscillation axis, in different natural oscillation modes simultaneously.

In accordance with a further aspect of the present invention, there is provided an optical instrument, comprising: a light source; and an oscillating device as recited above, for deflecting light from said light source; wherein at least a portion of the light deflected by said oscillating device is projected on an image display member or a photosensitive member.

Briefly, in an oscillating device according to the present invention, a temperature adjusting element such as a heating element and a Peltier device, for example, for adjusting the temperature of the resiliently supporting portion is provided. Thus, the natural oscillation mode of the oscillating system can be adjusted flexibly. Therefore, in an oscillating device such as an optical deflector, for example, arranged to perform optical scanning while exciting different natural oscillation modes simultaneously, all the natural frequencies to be excited can be adjusted precisely and easily in accordance with external conditions such as environment temperature, for example. Hence, stable driving of the deflector is assured.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5A is a top plan view of an optical deflector according to a second embodiment of the present invention.

FIG. 5B is a top plan view, showing a portion of the optical deflector according to the second embodiment of the present invention, near a first oscillation movable element thereof.

FIG. 5C is a top plan view, showing driving means for the optical deflector according to the second embodiment of the present invention.

FIG. 15A is a top plan view of a typical oscillating system according to the present invention.

FIG. 15B is a top plan view, for explaining a fixed position of the typical oscillating system shown in FIG. 15A.

FIG. 16 is a sectional view taken along a line Q-Q' in FIG. 15B.

DESCRIPTION OF THE PREFERRED EMBODIMENTS

Figures 1A, 1B:
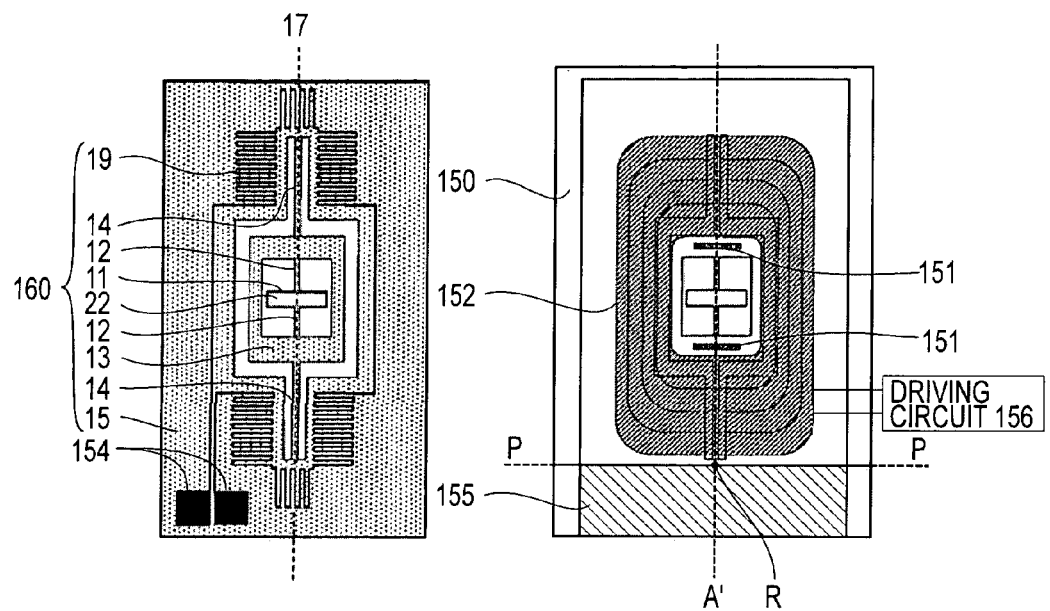
FIG. 1A is a top plan view of an optical deflector according to a first embodiment of the present invention.
FIG. 1B is a top plan view, showing driving means for the optical deflector according to the first embodiment of the present invention.

First, the present invention will be explained briefly, with reference to one preferred embodiment thereof.

An optical deflector according to one preferred embodiment of the present invention comprises an oscillating system, a stationary member for holding the oscillating system, and driving means for driving an oscillation movable element. The driving means may comprise a magnet and a coil, as will be described later. The oscillating system of this embodiment includes oscillation movable elements, resiliently supporting portions that comprise a torsion spring, and a supporting member. A first oscillation movable element is resiliently supported relative to the second oscillation movable element by means of a first torsion spring (resiliently supporting portion) for torsion oscillation about a torsional axis (predetermined oscillation axis). A second oscillation movable element is resiliently supported relative to the supporting member by means of a second torsion spring (resiliently supporting portion) for torsion oscillation about the torsional axis. The supporting member is fixed to the stationary member. The oscillating system has at least two natural oscillation modes of different frequencies, about the torsional axis. The driving means is configured to cause torsion oscillation of the oscillating system about the torsional axis, simultaneously in at least two natural oscillation modes.

In an optical deflector according to this embodiment, having an oscillating system described above, a heating element that produces heat is directly provided on the supporting member, the torsion spring or the stationary member. Where the heating element is provided on the supporting member or the stationary member, the structure may be made so that the heat produced in the supporting member or the stationary member is transferred to the torsion spring. With this structure, the temperature of the torsion spring is adjusted in accordance with any changes in external condition so as to adjust and stabilize the frequencies of natural oscillation modes, which are the object of driving, at desired values.

If the natural oscillation mode is unstable, the amplitude amplification factor and the phase of natural oscillation modes of two driving frequencies, for example, become unstable, such that the waveform of optical scan and the overall amplitude become unstable. Such unstableness is a serious problem to be solved, particularly in an optical deflector of this embodiment wherein the deflector should be driven in accordance with a combined wave of driving frequencies close to the frequencies of different natural oscillation modes.

In this embodiment, in consideration of it, the temperature of the torsion spring is adjusted during the combined-wave driving to thereby avoid even a small fluctuation of the natural oscillation mode resulting from a change in environment temperature, for example. As a result of wave combination, the waveform of optical scan and the overall amplitude can be stabilized. Hence, during image formation, the light spot position can be stabilized. Furthermore, where a lens is disposed after the optical deflector, since the relationship between the position and speed of optical scan is stabilized, a superior optical scanning unit can be accomplished. Particularly, since in this embodiment the heating element is directly mounted on the supporting member, the torsion spring or the stationary member, the heat capacity of the heating region can be made small and, thus, the time necessary for temperature adjustment and stabilization can be shortened.

Furthermore, in this embodiment, on the basis of the basic structure described above, a stress to be applied to the oscillating system, in a direction parallel to the torsional axis, can be reduced to further facilitate stabilization of optical scanning.

Generally, the spring constant of a torsion spring in the direction of torsional axis that determines the natural oscillation mode of the oscillating system (hereinafter, this will be referred to also as "torsion rigidity") is changeable with two major factors, that is, a change in Young's modulus of the member with temperature and the stress in the torsional axis direction. As regards the Young's modulus, many resilient materials show a tendency of decreases of Young's modulus with a temperature rise, and the torsion rigidity decreases. On the other hand, as regards the stress in the torsional axis direction, the torsion rigidity increases if a tensile stress is applied, and it decreases in the case of a compressive stress.

In an optical deflector according to this embodiment, a decrease of the stress in the torsional axis direction is quite important, more than in a case where a single movable element is resiliently supported by a torsion spring as disclosed in patent documents 1 and 2 mentioned hereinbefore. This will be explained in greater detail, below.

Figures 12A, 12B:
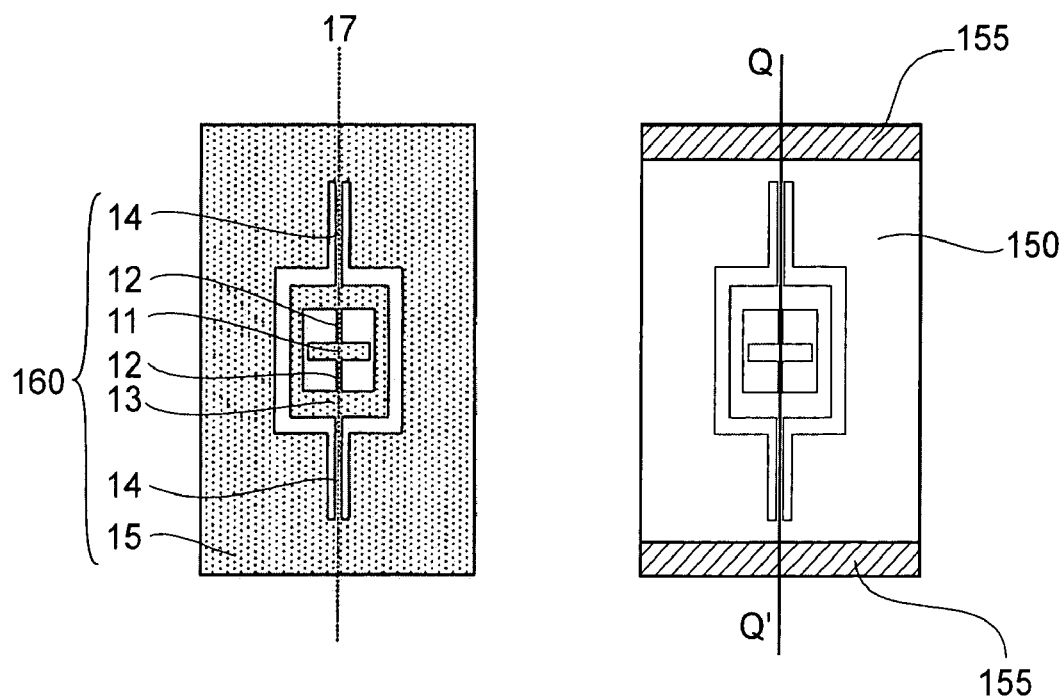
FIG. 12A is a top plan view of a typical oscillating system, for explaining inconveniences involved in conventional technique.
FIG. 12B is a top plan view for explaining a fixed position of a typical oscillating system.

FIG. 12A shows a typical example of optical deflector of this type. A first oscillation movable element 11 and a second oscillation movable element 12 are resiliently supported relative to a supporting member 15, by means of a pair of first and second torsion springs 12 and 14, for oscillating motion about a torsional axis 17. The first and second oscillation movable elements 11 and 13, the first and second torsion springs 12 and 14 and the supporting member 15 constitute an oscillating system 160.

In this example, as shown in FIG. 12B, the supporting member 15 is fixed to a stationary member 150 at a pair of bonding regions 155 sandwiching the oscillation movable elements 11 and 13 and the torsion springs 12 and 14 between them. Further, the oscillation movable elements 11 and 13, the torsion springs 12 and 14 and the supporting member 15 are made of the same material, and the thermal expansion coefficient of that material is smaller than the thermal expansion coefficient of the material that constitutes the stationary member 150.

Figure 13:
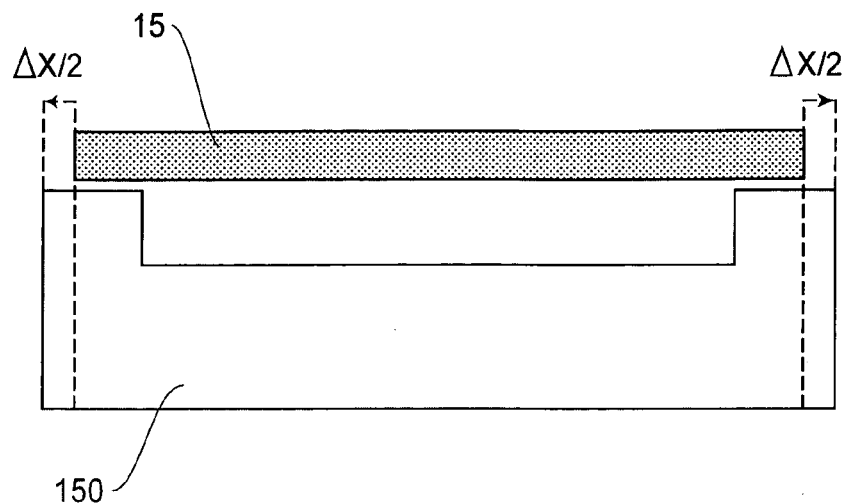
FIG. 13 is a sectional view taken along a line Q-Q' in FIG. 12B.

FIG. 13 is a sectional view taken along a line Q-Q' in FIG. 12B. Since the supporting member 15 is fixed to the stationary member 150 at two locations, if the environment temperature changes, although both of the supporting member 15 and the stationary member 150 thermally will expand, due to the difference in thermal expansion coefficient between them, there would be produced an expansion difference ΔX as schematically illustrated in FIG. 13. In FIG. 13, although the supporting member 15 and the stationary member 150 are illustrated as separate, this is merely for illustration and, actually, they are bonded to each other at the bonding region 155. Hence, the supporting member 15 would be elongated further by an amount of expansion difference ΔX. As a result of it, in accordance with a temperature rise from the assemblage, a tensile stress in the torsional axis direction would be applied to the oscillating system 160. If the difference between the thermal expansion coefficients of the supporting member 15 and the stationary member 150 is inverted, a tensile stress would be applied.

Figures 14A, 14B:
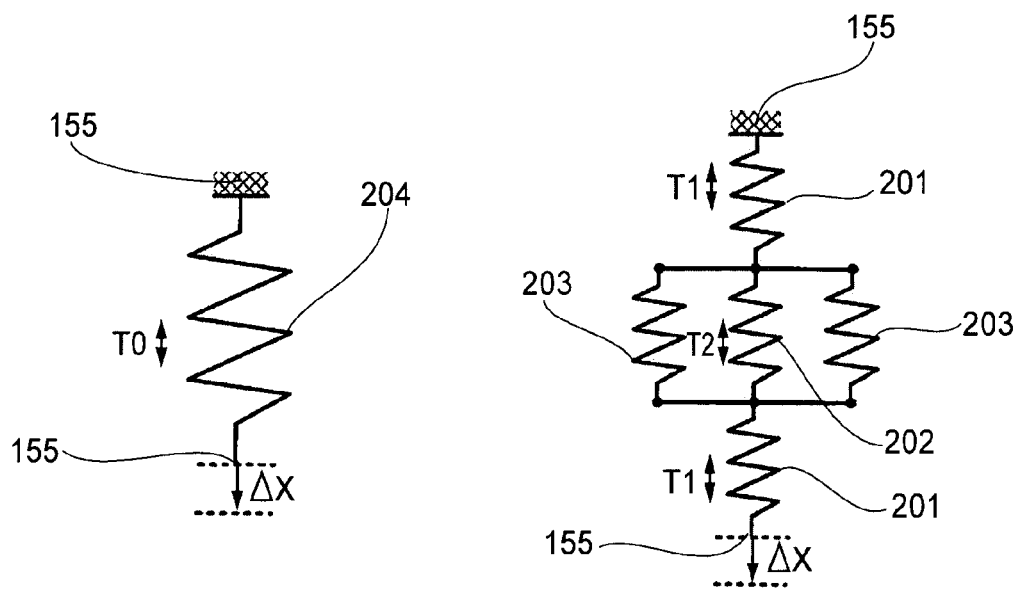
FIG. 14A is a schematic view for explaining an equivalent spring constant of a single-freedom oscillating system in an axial direction.
FIG. 14B is a schematic view for explaining an equivalent spring constant of a dual-freedom oscillating system according to the present invention, in an axial direction.

The force and extension ΔX in torsional axis direction are correlated in terms of the spring constant of the torsion spring. FIGS. 14A and 14B schematically illustrate the spring constant with respect to the extension in the axial direction. FIG. 14A shows a typical example such as discussed in the aforementioned patent documents 1 and 2, wherein a single movable element is resiliently supported by means of a single torsion spring. In the case of a single movable element such as shown in FIG. 14A, a pair of torsion springs have the same spring constant with respect to extension in the axial direction and, since they are connected in series through the movable element, the extension ΔX and the tensile force T0 are correlated in terms of substantially only one spring constant 204.

On the other hand, in an oscillating system such as shown in FIG. 14B (FIGS. 12A and 12B), there are three types of spring constants, that is, a spring constant 201 of the second torsion spring, an equivalent spring constant 202 of a pair of first torsion springs, and a spring constant 203 of the second oscillation movable element, all being connected such as shown in FIG. 14B. Thus, depending on the extension ΔX, tensile forces T1 and T2 applied to the first and second torsion springs 12 and 14 are different. Also, the influences upon the torsion rigidity of the two torsion springs are different. Therefore, the rate of change of the two natural oscillation modes of the oscillating system 160 shown in FIGS. 12A and 12B, with the temperature, would be different between these oscillation modes.

This means that, if there occurs an extension ΔX in the oscillation system 160 due to a change in environment temperature or to any mechanical external disturbance, the two natural oscillation modes will change differently at different changing rates. For example, if the frequencies of two natural oscillation modes are exactly adjusted at desired values and the optical deflector of this embodiment is actuated by two driving frequencies substantially corresponding to them, the following inconvenience may result. Namely, due to the extension ΔX, the relationship between the amplitude and the phase of the two frequency components being combined for the optical scanning is deteriorated seriously. To the contrary, however, if the stress in the axial direction is lowered, in an optical deflector having plural torsion springs as of this embodiment, it becomes possible to make the changing rates of the two natural oscillation modes, with respect to temperature, approximately equal to each other. Therefore, even if the temperature changes, any errors of amplitude ratio and phase difference of the frequency component, combined for the optical scanning, from the respective desired values can be reduced quite easily.

In consideration of this, in this preferred embodiment, in order to reduce the axial stress of the stationary member 150, the optical deflector may have a typical structure such as shown in FIGS. 15A through 18. In the top plan view of the optical deflector shown FIG. 15A, the components having similar functions as of those of FIG. 12A are denoted by like numerals. Like the FIG. 12A example, the optical deflector comprises a first oscillation movable element 11, a second oscillation movable element 13, a first torsion spring 12, a second torsion spring 14 and a supporting member 15. FIG. 15B shows a bonding region 155 where the supporting member 15 is bonded to the stationary member 150. In FIG. 15B, as compared with the example of FIGS. 12A and 12B, the bonding region 155 is single and it does not sandwich the second torsion spring 14. The bonding region 155 is formed only at one side of a line P-P that extends through a junction R between one of the second torsion springs 14 and the supporting member 15 and that is perpendicular to the torsional axis 17, the one side being remote from the portion where the first and second oscillation movable elements are formed. Hence, as shown in the sectional view of FIG. 16 taken along a line Q-Q', without interference to the drive of the optical deflector based on torsion oscillation and as seen from the stationary member 150, the oscillating system 160 including the first oscillation movable element 11, the supporting member 15 and the like can have a cantilever structure. Due to such cantilever structure, approximately no axial stress resulting from expansion or contraction of the stationary member 150 is transmitted to the first and second torsion springs 12 and 14.

Figures 17A, 17B:
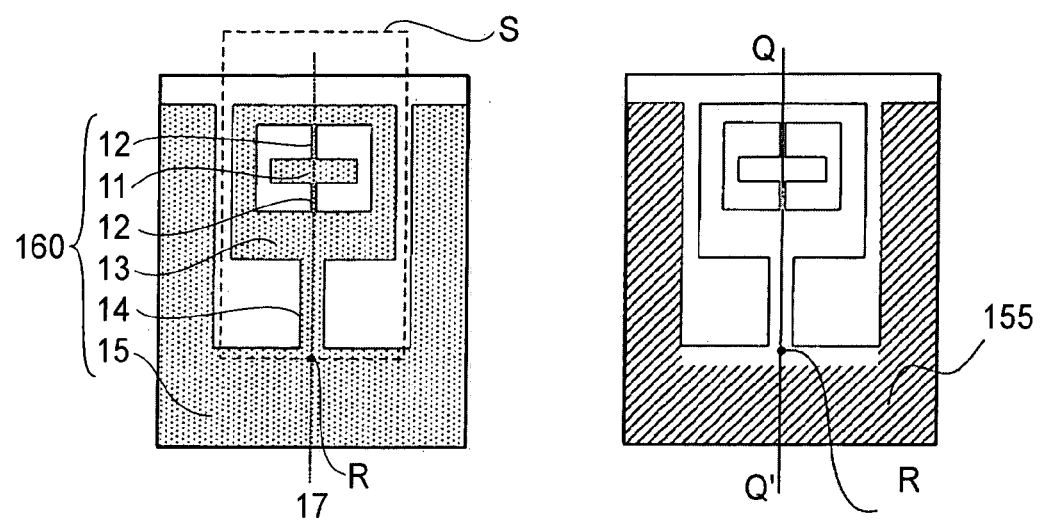
FIG. 17A is a top plan view of another example of typical oscillating system according to the present invention.
FIG. 17B is a top plan view, for explaining a fixed position of the typical oscillating system shown in FIG. 17A.

On the other hand, FIG. 17A shows another typical example. Also in FIG. 17A, the components having similar functions as of those of FIGS. 12A and 15A are denoted by like numerals. The example of FIG. 17A differs from FIG. 15A in that there is only a single second torsion spring 14. FIG. 17B shows a bonding region 155 where the supporting member 15 is bonded to the stationary member 150. The bonding region 155 has such shape that, with respect to the junction R between the second torsion spring 14 and the supporting member 15, it is projected toward the side where the first and second oscillation movable elements are formed. However, as depicted by a broken line S in FIG. 17A, since the second torsion spring 14 is single, relative to the stationary member 14, the first and second oscillation movable elements 11 and 13 and the first and second torsion springs 12 and 14 provide a cantilever structure.

Figure 18:
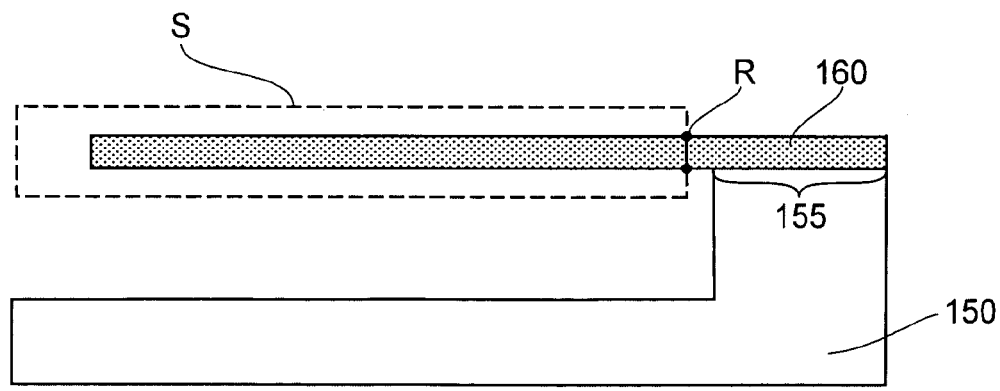
FIG. 18 is a sectional view taken along a line Q-Q' in FIG. 17B.
Figure 19:
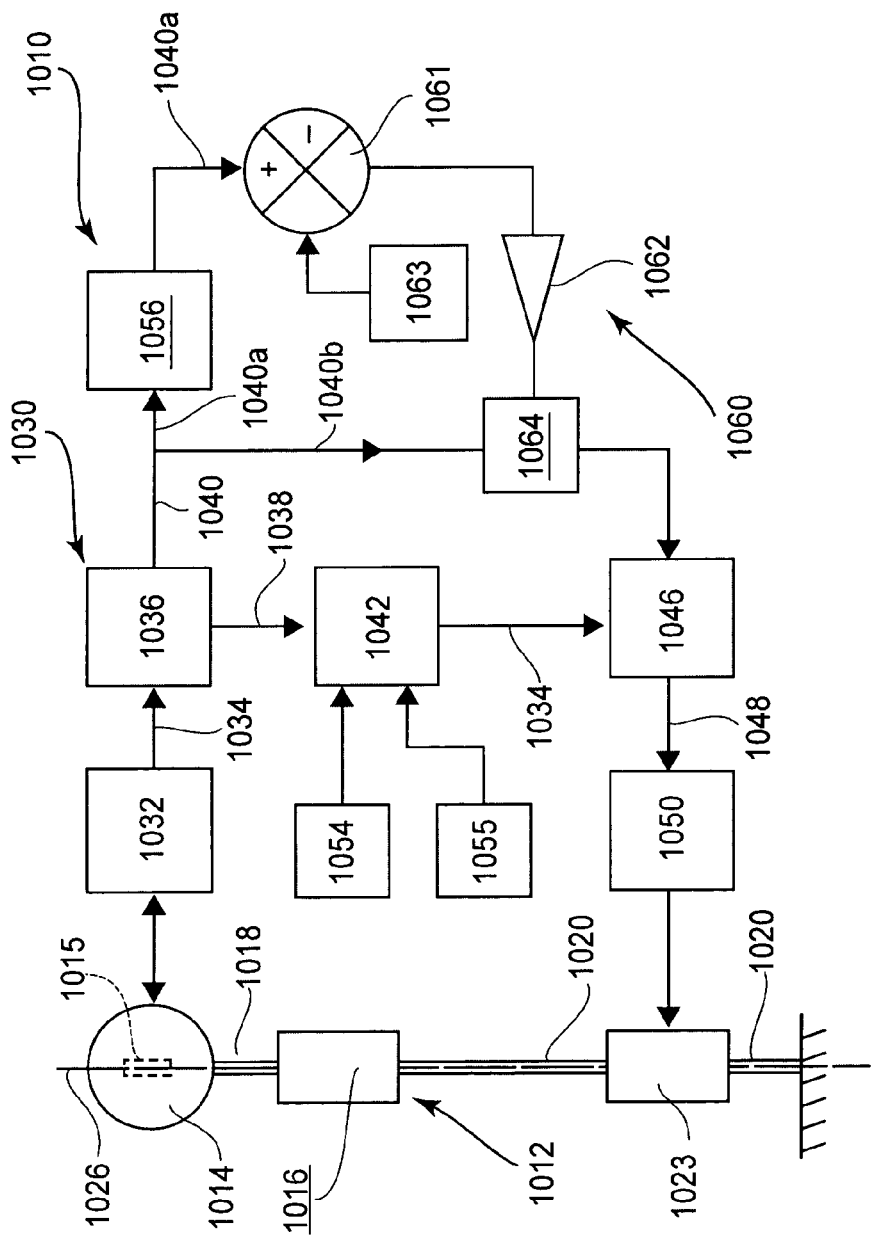
FIG. 19 is a block diagram for explaining the structure of a conventional optical deflector.

Thus, the resultant structure is such as best shown in the sectional view of FIG. 18, taken along the line Q-Q' in FIG. 17B. Namely, regardless of the shape of the bonding region 155 between the supporting member 15 and the stationary member 150 and without interference to the drive of the optical deflector based on torsion oscillation, relative to the stationary member 150, the first and second oscillation movable elements 11 and 13, the first and second torsion springs 12 and 14 and the supporting member 150 can have a cantilever structure. Due to such cantilever structure, approximately no axial stress resulting from expansion or contraction of the stationary member 150 is transmitted to the first and second torsion springs 12 and 14.

On the other hand, in the cantilever structure, the stress in a direction parallel to the torsional axis and to be added to the oscillating system from the stationary member 150 can be reduced, if the following. arrangement is adopted. Namely, the supporting member 15 and the stationary member 150 may be provided with temperature adjusting elements, respectively, so as to control the temperature of the supporting member 15 and the temperature of the stationary member 150 independently of each other. In that occasion, while the thermal expansion coefficient of the supporting member 15 and the thermal expansion coefficient of the stationary member 150 are taken into account, the temperature adjusting elements of the supporting member 15 and the stationary member 150 may be controlled independently of each other so that the lengths in the torsional axis direction of the supporting member 15 and the stationary member 150 change by approximately the same amount. In such case, since the temperatures of the supporting member 15 and the stationary member 150 are controlled independently, preferably the supporting member 15 and the stationary member 150 should be thermally isolated from each other. As an alternative, a temperature adjusting element may be provided at the resiliently supporting portion, to heat the supporting member.

In the structure described above, adjustment and stabilization of the torsion oscillation of the first oscillation movable element having a reflection surface, about the torsional axis, is carried out on the basis of control of the temperature adjusting element, and it can be done in accordance with a few methods. A simple method is that the temperature of the spring is monitored by use of a temperature sensor and, if the temperature goes out of a predetermined temperature, the temperature adjusting element is controlled to adjust the temperature toward a predetermined level. Another method is that a sensor for measuring the displacement angle of the oscillating movable element is used to monitor the frequency of the movable element and, if the frequency goes out of a predetermined frequency, the temperature adjusting element is controlled so as to adjust the frequency of the oscillation movable element toward the predetermined frequency.

Where a heating element is used as the temperature adjusting element, the torsion spring may be heated by the heating element beforehand, to assure that the temperature at the time of driving is sufficiently higher than the ambience temperature. In that occasion, the adjustment of the frequency of natural oscillation mode can be done with a reduced heat generation amount of the heating element.

In this preferred embodiment, as described hereinbefore, the stress in a direction parallel to the torsional axis, to be added to the oscillation system, is reduced by which the changing rates of plural natural oscillation modes with respect to temperature can be made approximately equal to each other. As a result, approximately no change occurs in the frequency of natural oscillation mode due to the stress in a direction parallel to the torsional axis. Hence, in the resultant structure, the factors of frequency change except the temperature are avoided. Therefore, the frequency stabilization based on the temperature adjusting element can be done very precisely. Furthermore, even if there is a temperature difference between the stationary member 150 and the supporting member 15, by this temperature adjusting element the frequency stabilization can be done satisfactorily. Furthermore, since the changing rates of plural natural oscillation mode with respect to temperature are approximately the same, the relationship between the amplitude ration and the phase of plural natural oscillation modes does not easily change with a small temperature change.

On the other hand, if a double-end support structure is used in which the supporting member 15 and the stationary member 150 are supported at the opposite sides of the torsional axis direction, frequency stabilization based on a temperature adjusting element can be done. In that occasion, although the changing rates of plural natural oscillation modes with the temperature may be different as described hereinbefore, stabilization can be done if the plural frequencies at the controlled target temperature at the time of the driving are all target frequencies. Namely, this can be done by appropriately setting the mechanical characteristics (such as shape, mass and rigidity, for example) of the oscillation movable element and the resiliently supporting portion that constitute the oscillating system beforehand so as to assure that the natural oscillation mode at a controlled target temperature is done at the target frequency. Furthermore, where the heating element is configured to perform independent temperature adjustment of temperatures of plural torsion springs, satisfactory frequency stabilization can be done even if there is a large temperature difference between the stationary member 150 and th supporting member 15. This will be explained in greater detail with reference to Embodiment 2, to be described later.

In the structure described above, the driving means causes torsion oscillation of the oscillating system about the torsional axis, simultaneously in at least two natural oscillation modes. However, it is a possible alternative that the oscillating system is flexure-oscillated about a predetermined axis. In that case, the structure may be that, in FIG. 17, for example, only a single first torsion spring 12 is used and, from the supporting member, a second flexure spring, a second oscillation movable element, a first flexure spring and a first oscillation movable element are connected together in series. In such structure, the movable element provides flexure-oscillation about a flexure-oscillation axis extending through the junction R and being included in the plane of the sheet of FIG. 17, perpendicular to the second flexure spring, an in a direction perpendicular to that plane. In this case, the driving mean may comprise a coil at the oscillating system side and a magnet at the stationary member side. The magnetic field from the magnet may be produced upwardly and downwardly in the plane of sheet of FIG. 17, in a portion near the free end portion of the cantilever structure, and it may be applied to the coil disposed at the free end portion of the oscillating system (see the coil of FIG. 6).

The temperature adjusting element such as a heating element or a Peltier device, for example, may be disposed at the stationary member side, not in the oscillating system. Particularly, in the case of cantilever structure, the temperature adjusting function from the temperature adjusting element at the stationary member side is transmitted from the bonding region between the supporting member 15 and the stationary member 150 to the resiliently supporting portion, and it does not spread from the opposite side. Hence, the disposition of temperature adjusting element mentioned above is still effective. It should be noted that the deflector is not limited to use in optical deflection. It may be used for deflection of electromagnetic waves such infrared rays. or ultraviolet rays, for example.

Now, some preferred embodiments of the present invention will be explained specifically, with reference to the attached drawings.

Embodiment 1

FIGS. 1A and 1B are top plan views, showing an optical deflector according to a first embodiment of the present invention. Specifically, FIG. 1A illustrates an oscillating system 160, and FIG. 1B illustrates a stationary member 150 for holding the oscillating system 160 and driving means therefor. As shown in FIG. 1A, the oscillating system 160 of this embodiment comprises a first oscillation movable element 11, a second oscillation movable element 13, first torsion springs 12 for connecting and resiliently supporting them, and second torsion springs 14 for resiliently supporting the second oscillation movable element 13 and a supporting member 15 which is a mechanical ground. Heater wires 19 as heating elements are disposed on the supporting member 15, around the second torsion springs 14. Each heater wire 19 is connected to a control circuit through electrode pads 154.

The first and second oscillation movable elements are torsionally oscillated about a torsional axis by driving means to be described later. Here, the oscillating system 160 is produced integrally from a monocrystal silicon substrate through a photolithographic process and a dry etching process, conventionally included in semiconductor manufacturing processes. Hence, the processing precision is very high and a quite small oscillation system can be produced. Furthermore, since monocrystal silicon has large Young's modulus and small density, deformation of the movable element 11 due to the dead weight thereof during the driving is very small and, furthermore, an oscillating system having high amplitude amplification factor in the resonance can be provided. In this example, the first oscillation movable element 11 has a size 3 mm in a direction perpendicular to the torsional axis 17 and a size 4 mm in a direction parallel to it. The first torsion spring has a length 1.3 mm while the second torsion spring has a length 6 mm. The total length of the oscillating system 160 is about 20 mm.

The first oscillation movable element 11 is supported, at its opposite sides, by the paired two first torsion springs 12. The first oscillation movable element 11 has a reflection surface 22 formed thereon and, therefore, the flatness of the same when it is driven is particularly important. Since the first oscillation movable element is supported by the paired two torsion springs, as compared with the case of using a single spring, deformation due to the dead weight can be reduced and the flatness can be maintained very well. Similarly, the second oscillation movable element 13 is supported, at its opposite sides, by the paired two second torsion springs 14. With this arrangement, the oscillating system 160 has a structure that unwanted vibration or displacement other than the torsion oscillation about the torsional axis is reduced considerably.

The first oscillation movable element 11 has a reflection surface 22 as an optical deflector for deflecting the light, and it functions to deflectively scan the light from a light source, not shown, through the torsional oscillation of the first oscillation movable element 11. The reflection surface 22 is made of aluminum, having been formed there by vacuum vapor deposition. The reflection surface may be made of a different material such as gold or copper, for example. A protection film may be provided at the outermost surface thereof.

Figure 2:
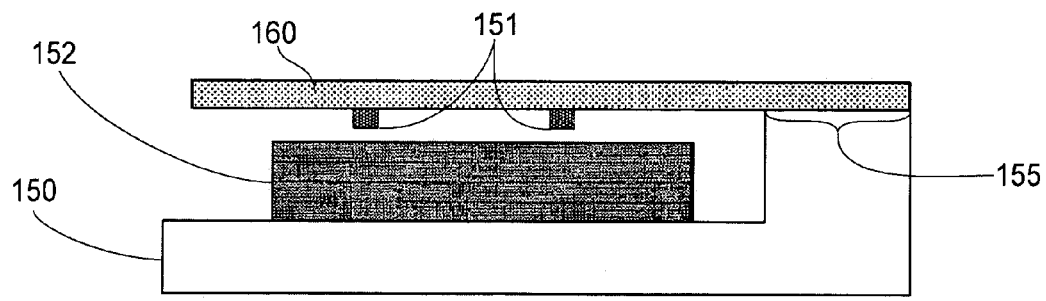
FIG. 2 is a sectional view of the optical deflector according the first embodiment of the present invention, taken along a line A-A' in FIG. 1B.

FIGS. 1B and 2 best illustrate the stationary member 150 and driving means in accordance with this embodiment. FIG. 1B is a top plan view (where the oscillating system 160 are shown superposedly), and FIG. 2 is a sectional view taken along a line A-A' in FIG. 1B. As shown in these drawings, the driving means of this embodiment comprises two permanent magnets 151 bonded to the second oscillation movable element 13 and a stationary coil 152 fixed to the stationary member 150. Each permanent magnet 151 is a metal magnet having prismatic shape, with a length of about 1 mm and a sectional size of 150 μm×150 μm. The direction of magnetization of each permanent magnet 151 extends along the lengthwise direction (a direction approximately perpendicular to the torsional axis 17), and the magnets are fixed to the second oscillation movable element 11 by means of an adhesive agent. As shown in FIG. 2, the stationary member 150 properly holds the positions of the oscillating system 160, the permanent magnets 151 and the stationary coil 152. In this example, the stationary member 150 is made of aluminum. However, it may be made of any other ordinary metal material such as, for example, an alloy that contains iron or an alloy that contains copper.

In driving operation, a driving AC electric current is applied to the stationary coil 152, and the coil produces a magnetic field in a direction approximately perpendicular to the sheet of FIG. 1B. This magnetic field acts on the permanent magnet 151 by which a torque about the torsional axis 17 is produced, whereby the oscillation movable elements 11 and 13 are driven.

On the other hand, as shown in FIGS. 1B and 2, the supporting member 15 is fixed to the stationary member 150 at bonding regions 155 shown by hatching. As shown in FIG. 1B, with respect to one of the two second torsion springs 14, there is no bonding region at one side of the junction 155 between the supporting member 15 and the stationary member 150 where the first and second oscillation movable elements are formed. Thus, the oscillating system 160 has a cantilever structure with respect to the stationary member 150. Due to this cantilever structure, axial stresses from the stationary member 150 to the torsion spring can be reduced.

Next, the driving principle of sawtooth-wave-like oscillation of the optical deflector of this embodiment will be explained in greater detail. The oscillating system 160 of this embodiment has been processed, based on the processing precision, so that, with regard to the torsional oscillation about the torsional axis 17, it has a first-order natural oscillation mode of a frequency $f_1$ and a second-order natural oscillation mode of a frequency $f_2$ which is approximately twofold of the reference frequency. This oscillating system 160 can be regarded as a dual-freedom oscillating system in terms of torsion oscillation.

On the other hand, in accordance with a combined driving signal resulting from the reference frequency $f_0$ which is a target driving frequency as determined by the specifications of application and the frequency $2f_0$ which is twofold of the reference frequency $f_0$, the stationary coil 152 drives the oscillation movable elements 11 and 13. The reference frequency $f_0$ and the natural mode frequencies $f_1$ and $f_2$ have a relation to be described below, and the optical deflector of this embodiment can perform combined-wave drive at low power consumption on the basis of a high dynamic magnification (amplitude amplification factor) of the natural oscillation mode.

Particularly, the natural mode frequency $f_1$ is designed to be close to the reference frequency $f_0$. Here, if the mode attenuation ratio of the first-order and second-order natural oscillation modes (it represents the sharpness of the peak of the frequency characteristic curve of the dynamic magnification, at the natural mode frequency, and it is approximately equal to ½Q) is denoted by $\gamma_1$ and $\gamma_2$, the range thereof can be expressed as follows.

$$f_0(1-2\gamma_1) < f_1 < f_0(1+2\gamma_1) \quad (1)$$

Furthermore, in this embodiment, the following range is set with regard to the frequency ratio of the natural mode frequencies $f_1$ and $f_2$, and it is referred to as "approx. twofold". Here, "approx. twofold" should desirably be included in the numerical value range from about 1.98-fold to about 2.20-fold.

$$-2(\gamma_1+\gamma_2)+1 < 2\frac{f_1}{f_2} < 2(\gamma_1+\gamma_2)+1 \quad (2)$$

In addition to this, in this embodiment, the frequency ratio is in the following range.

$$-(\gamma_1 + \gamma_2) + 1 < 2\frac{f_1}{f_2} < (\gamma_1 + \gamma_2) + 1 \quad (3)$$

In the oscillating system 160 of this embodiment, $\gamma_1$ is about 0.0025 and $\gamma_2$ is about 0.00025. Thus, as seen from the relations (1)-(3), in this embodiment, through the stationary coil 152, oscillations of frequencies $f_0$ and $2f_0$ are excited near the peak of the two natural oscillation modes, and the oscillation movable elements 11 and 13 are driven thereby. Particularly, in the case of the range of the relation (1) above, with regard to the oscillation of the frequency f0 which is the main component of the consumed voltage in the combined drive, the range of a high dynamic magnification (amplitude amplification factor) of the first-order natural oscillation mode is usable. Therefore, the optical deflector can be made small in power consumption.

The manner of driving will be explained below in greater detail.

Figure 3:
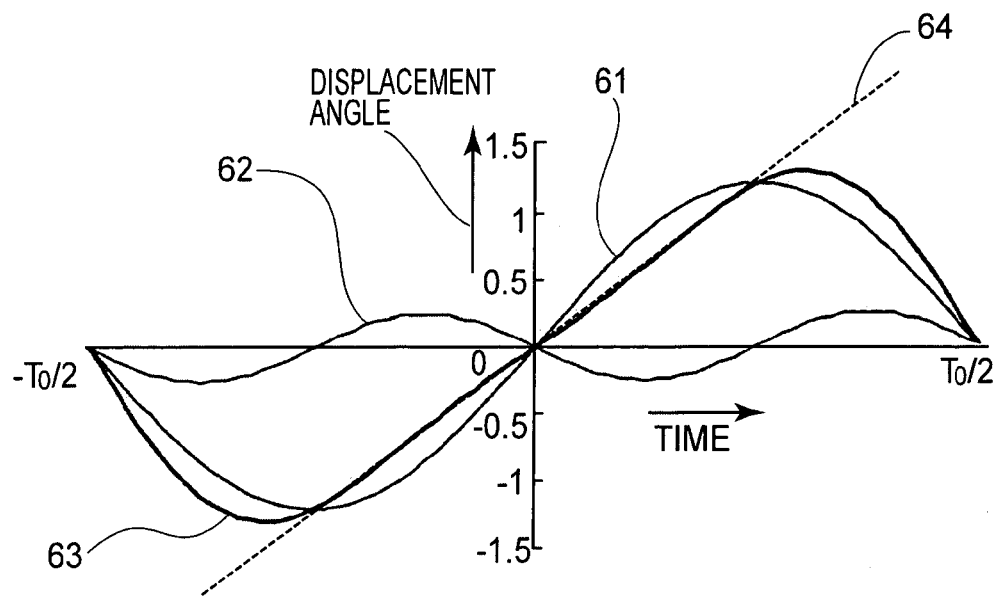
FIG. 3 is a graph for explaining the displacement angle of light deflectively scanned by an optical deflector according to the first embodiment of the present invention.

FIG. 3 is a graph for explaining the displacement angle of torsional oscillation of the first oscillating movable element 11 at a frequency $f_0$, while time t is taken on the axis of abscissa. In this specification, since the displacement angle of reciprocal oscillation of the movable element and the displacement angle of light deflectively scanned by the optical deflector differ from each other only in the constant, they are treated equivalently. The graph of FIG. 13 specifically shows the portion that corresponds to one cycle $T_0$ of the torsional oscillation of the first oscillating movable element 11 ($-T_0/2 < X < T_0/2$).

A curve 61 shows the component of the reference frequency $f_0$, of the driving signal for driving the stationary coil 152. It is sine oscillation reciprocally oscillating in a range of largest amplitude $\pm\phi_1$, and being expressed by a relation (4) below, where time is denoted by t and the angular frequency is denoted by $w_0 = f\pi f_0$.

$$\theta_1 = \phi_1 \sin[w_0 t] \quad (4)$$

On the other hand, a curve 62 shows the component of a frequency which is twofold of the reference frequency $f_0$. It is sine oscillation, oscillating in a range of largest amplitude $\pm\phi_1$ and being expressed by a relation (5) below.

$$\theta_2 = \phi_2 \sin[2w_0 t] \quad (5)$$

A curve 63 shows the displacement angle of torsional oscillation of the first oscillation movable element 11 that is produced as a result of the driving described above. As described hereinbefore, in regard to the torsion oscillation about the torsional axis 17, the optical deflector has a natural oscillation mode at a frequency $f_1$ which is adjusted with respect to the reference frequency $f_0$ and around $2f_0$ which is twofold of the reference frequency, and a second-order natural oscillation mode of a frequency $f_2$. Therefore, in the optical deflector, there occurs resonance excited by the driving signals of $\theta_1$ and $\theta_2$ described above. Namely, the displacement angle of the first oscillation movable element 11 in the curve 63 is superposed oscillation of two sine oscillations, and it is sawtooth-wave oscillation that can be expressed by a relation (6) below.

$$\theta = \theta_1 + \theta_2 = \phi_1 \sin[w_0 t] + \phi_2 \sin[2w_0 t] \quad (6)$$

Figure 4:
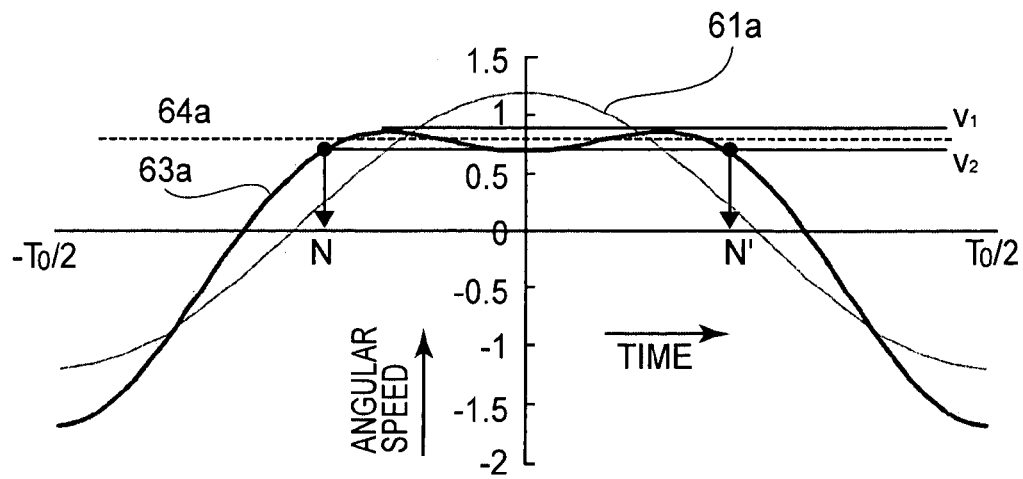
FIG. 4 is a graph for explaining the angular speed of light deflectively scanned by an optical deflector according to the first embodiment of the present invention.

FIG. 4 shows curves 61a and 63a and a straight line 64a, obtained by differentiating the curves 61 and 63 and the straight line 64 of FIG. 3, and it illustrates the angular speed of these curves. As compared with the curve 63 of angular speed of sine oscillation at the reference frequency $f_0$, the curve 63a that represents the angular speed of sawtooth-wave reciprocal motion of the first oscillation movable element 11 is so defined that, in a section from N to N', the angular speed is converged to a range with largest and smallest levels corresponding to the angular speed $V_1$ of the maximum point and the angular speed $V_2$ of the minimum point, respectively. Thus, in the application of deflective scan of light through the optical deflector, if $V_1$ and $V_2$ are included within the tolerable error range of the angular speed from the straight line 64a (constant angular speed scan), the section from N to N' can be regarded as a substantially constant angular speed scan. As described above, as compared with a case wherein the displacement angle is sine wave, through the sawtooth-wave-like reciprocal oscillation, the angular speed of the deflective scan enables a wide region in which the angular speed is substantially constant. Hence, with respect to the whole deflective scan region, the region that can be used is widened.

Although in this embodiment a case wherein the frequencies of the two natural oscillation modes are in a twofold relation has been described, if the frequencies are in a threefold relation, superposed oscillations will have an approximately triangular-wave shape. In that occasion, since an approximately constant angular speed region appears in the reciprocal motion in the deflective scan, this is particularly advantageous in applications wherein constant angular speed is used in the reciprocal motion.

Turning back to the heating element 19 which is a temperature adjusting element, in this embodiment this is made from an aluminum thin-film resistance. At as preprocess for dry-etching the oscillating system 160, aluminum is vacuum deposited and, after that, the aluminum thin film is patterned through photolithography. By this, the reflection surface 22 and the heating element 19 such as shown in FIG. 1A can be produced simultaneously. Thus, in this embodiment, the heating element 19 and the reflection surface 22 can be produced by a single photolithographic process, and the manufacturing cost is lowered. The heating element 19 may be made from a thin-film resistance made of a different metal such as platinum, for example.

Since the amount of Joule heat generation can be adjusted by adjusting the voltage application to the heating element 19, the temperature control of. the torsion springs 12 and 14 can be done based on it. By using resistance heating through thin-film resistance, the heating can be done with a quite simple structure.

The oscillating system 160 of this embodiment has a cantilever structure and, therefore, axial stress from the stationary member 150 is reduced. As a result, any change in the torsion rigidity of the first and second torsion springs 12 and 14 will be a change that follows substantially only the temperature change of Young's modulus. Thus, these have approximately the same changing rates. With regard to the change of two resonance frequencies (frequencies of natural oscillation modes) of the oscillating system 160, they have approximately the same changing rate with a temperature change. Therefore, through the temperature adjustment by the heating element 19, two resonance frequencies can be changed simultaneously by the same proportion. Thus, the two resonance frequencies can be adjusted to desired frequencies very easily. Additionally, since the axial stress is reduced, even if the temperature of the oscillating system 160 is changed for the frequency adjustment, the first oscillation movable element 11 having a reflection surface 22 can hold it flatness.

Since the heating element 19 is not formed on the torsion spring, the load of repeated stress due to the driving of the oscillation movable elements 11 and 13 can be avoided. Therefore, breakage or deterioration of the wire of the heating element 19 can be avoided, and the life duration of the device can be prolonged. Simultaneously, no adverse influence is applied to the torsional rigidity or breakage characteristic of the torsion springs 12 and 14, the life duration of the oscillating system 160 is prolonged further.

The heating element 19 is directly mounted on the supporting member 15. Therefore, the heat capacity of the object of heating can be small, and the power consumption at the heating element can be small. Additionally, the time necessary for the temperature adjustment can be shortened.

Due to the cantilever structure, the thermal contact area between the supporting member 15 and the stationary member 150 can be made small, and the heat generation at the heating element 19 can be utilized effectively for the temperature control of the torsion spring, without large diffusion toward the stationary member 150. Furthermore, since the oscillating system 160 is made from monocrystal silicone, the heat conductivity is good. Thus, through the heat generation at the heater wire 19, uniform temperature rise of the oscillating system 160 can be accomplished easily. It should be noted here that, also in this embodiment, the heating element 19 may be controlled essentially in the same manner as has been described with reference to the preceding embodiments.

Embodiment 2

FIGS. 5A, 5B and 5C are top plan views, respectively, for explaining an optical deflector according to a second embodiment of the present invention. The components having similar functions as of those of the first embodiment are denoted by like numerals, and description therefor will be omitted. Only distinctive features of this embodiment will be explained in detail. As shown in FIG. 5A, in the optical deflector of this embodiment, a first oscillation movable element 11, a first torsion spring 12, a second oscillation movable element 13, a second torsion spring 14, a supporting member 15 and a reflection surface 22 all have similar materials, structures and functions as of those of the first embodiment. Further, as shown in FIG. 5C, the oscillating system 160 is bonded to the stationary member 150 only at the bonding region 155, like the first embodiment. Hence, the oscillation system 160 has a cantilever structure with respect to the stationary member 150, and any stresses in the axial direction from the stationary member 155 to the oscillating system 160 can be reduced effectively.

This embodiment differs from the first embodiment in that, as shown in FIG. 5A, there are two heating elements, namely, a first heater wire 20 and a second heater wire 21. These two heater wires are provided with first and second electrode pads 154a and 154b, respectively, which are connected to respective control circuits, such that the heat generating amounts of the heater wires can be controlled independently of each other.

The first heater wire 20 extends through the first electrode pad 154a, the second torsion spring 14, the second oscillation movable element 13 and the first torsion spring 12. On the other hand, the second heater wire 21 extends through the second electrode pad 154b, the second torsion spring 14, and the second oscillation movable element 13. Thus, the zones to be heated by the first heater wire 20 and the second heater wire 21 are different. By controlling these heater wires independently, temperatures of different zones can be adjusted. Particularly, in this embodiment the heater wires are directly disposed at the torsion spring portions. As a result, the portion which is most influential to the frequency of natural oscillation mode can be heated effectively and the voltage consumption for the temperature adjustment can be made small. Additionally, since the heat capacity is small, the temperature adjusting time can be shortened.

Of the two natural oscillation modes of the oscillating system 160, there is a tendency that the basic frequency is largely influenced by the torsion rigidity of the second torsion spring 14, while the second order natural oscillation mode is largely influenced by the torsion rigidity of the first torsion spring 12. Therefore, if the temperatures of the first and second torsion springs 12 and 14 can be controlled independently of each other, two resonance frequencies, for the driving, of the oscillating system 160 of this embodiment can be adjusted very precisely.

FIG. 5B is a top plan view wherein a portion around the first oscillating movable element 11 of FIG. 5A is enlarged. As shown in the drawing, the first heater wire 20 has a folded structure upon the first torsion spring 12, such that, without reducing the area of the reflection surface 22 on the first oscillating movable element 11, both of the pair of first torsion springs 12 can be heated.

The operation and function of this embodiment are basically the same as those of the first embodiment. Further, like the first embodiment, use of the cantilever structure enables smallness of the thermally contact area with the stationary member 150. Thus, the heat generation at the heating element can be used effectively for the temperature control of the torsion springs 12 and 14, without a large loss to the stationary member 150.

In this embodiment as well, the oscillating system 160 is made of monocrystal silicon, and it is very good in heat conductivity. Hence, through the heat generation of the first and second heater wires 20 and 21, temperatures of respective zones of the torsion springs 12 and 14 can be adjusted effectively.

By the way, since in this embodiment the temperatures of the first and second torsion springs 12 and 14 can be controlled independently of each other, even if there is an influence of axial stress from the stationary member 150 to the oscillation system 160, plural resonance frequencies can be easily adjusted in a desired direction, independently of each other. Therefore, without using a cantilever structure and if the supporting member 15 and the stationary member 150 are fixed at the opposite sides with respect to the torsional axis direction, for example, the frequencies can be stabilized satisfactorily regardless of a large temperature difference between the stationary member 150 and the oscillating system 160.

Embodiment 3

Figure 6:
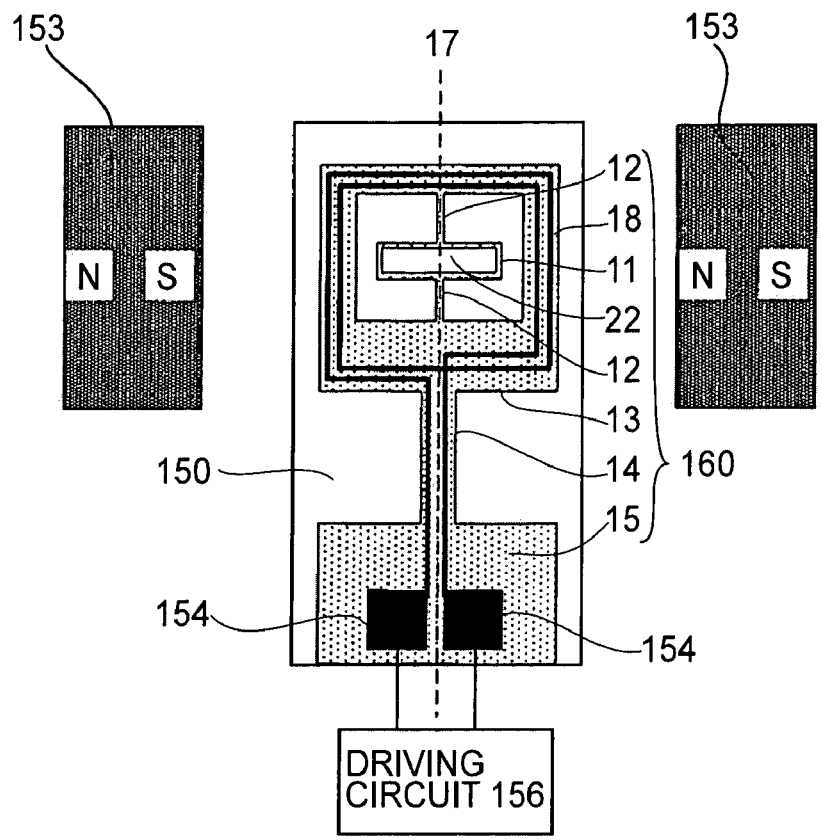
FIG. 6 is a top plan view of an optical deflector according to a third embodiment of the present invention.

FIG. 6 is a top plan view of an optical deflector according to a third embodiment of the present invention. In the drawing, the components having similar functions as of those of the first embodiment are denoted by like numerals, and description therefor will be omitted. Only distinctive features of this embodiment will be explained in detail. As shown in the drawing, in the optical deflector of this embodiment, the oscillating system 160 comprises a first oscillation movable element 11, a second oscillation movable element 13, a first torsion spring 12 for connecting and resiliently supporting them, a second torsion spring 14 and a supporting member 15. The second torsion spring 14 is connected to the supporting member 15. The supporting member 15 is fixed to the stationary member 150. The first and second oscillation movable elements 11 and 13 are torsionally oscillated by the driving means, to be described below, about the torsional axis 17.

In this embodiment as well, the oscillating system 160 is produced integrally from a monocrystal silicon substrate through a photolithographic process and a dry etching process, conventionally included in semiconductor manufacturing processes. Hence, the processing precision is very high and a quite small oscillation system can be produced. Furthermore, since monocrystal silicon has large Young's modulus and small density, deformation of the movable element 11 due to the dead weight thereof is very small and, furthermore, an oscillating system having high amplitude amplification factor in the resonance can be provided. In this example, the first oscillation movable element 11 has a size 3 mm in a direction perpendicular to the torsional axis 17 and a size 1 mm in a direction parallel to it. The first torsion spring 12 has a length 1.3 mm while the second torsion spring 14 has a length 5.5 mm. The total length of the oscillating system 160 is about 14 mm.

The oscillating system 160 has two natural oscillation modes having a frequency ratio of about 1:2, described with reference to the first embodiment. Driving is carried out on the basis of a combined driving signal of 1:2 near these two resonance frequencies, wherein sawtooth-wave like driving can be made. These two resonance frequencies have a frequency ratio of about 1:2, determined on the basis of the machining precision of the oscillating system 160.

The first oscillation movable element 11 has a reflection surface 22 as an optical deflector for deflecting the light, and it functions to deflectively scan the light from a light source through the torsional oscillation of the first oscillation movable element 11. The reflection surface 22 is made of aluminum, having been formed there by vacuum vapor deposition. The reflection surface may be made of a different material such as gold or copper, for example, as has been described with reference to the first embodiment. A protection film may be provided at the outermost surface thereof.

In this embodiment, the driving means comprises a movable coil 18 fixed onto the second oscillation movable element 13, and permanent magnets 153 fixed to the stationary member 150 and disposed beside the oscillating system 160. The movable coil 18 can be formed by electroplating of copper. The wires have a thickness 5 µm and a width 10 µm, and the wire spacing is 5 µm.

Although in FIG. 6 the number of windings for the coil 18 is reduced for schematic illustration, actually the coil has windings of a number of about 12 to 15, and these coils are disposed in the manner as illustrated. With regard to the driving, the permanent magnets 153 produce a uniform magnetic field inside the plane of the sheet of FIG. 6 and in a direction perpendicular to the torsional axis 17, which magnetic field acts on the AC current that flows through the movable coil 18 to produce a torque about the torsional axis 17. While the frequency of this AC electric current is used as two resonance frequency of the oscillating system 160, sawtooth-wave-like oscillation of the first oscillation movable element 11 is excited.

Figure 7:
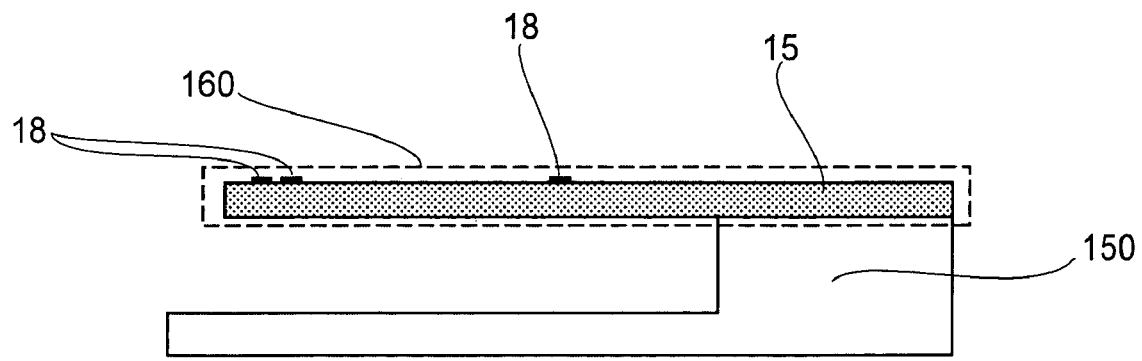
FIG. 7 is a sectional view of the optical deflector according the third embodiment of the present invention, taken on a torsional axis 17 shown in FIG. 6.

The first oscillation movable element 11 is supported, at its opposite ends, by the paired first torsion springs 12. The first oscillation movable element 11 has a reflection surface 22 formed thereon and, therefore, the flatness of the same when it is driven is particularly important. Since the first oscillation movable element is supported by the paired two torsion springs 12, as compared with the case of using a single spring, deformation due to the dead weight can be reduced and the flatness can be maintained very well. On the other hand, the second oscillation movable element 13 is supported, at a single end, by a single second torsion spring 14. FIG. 7 is a sectional view taken along a line of the torsional axis 17 of FIG. 6. As illustrated, the supporting member 15 of the oscillating system 160 is fixed to the stationary member 150. Thus, the oscillating system 160 is supported by a cantilever structure, with respect to the stationary member 150. Due to this cantilever structure, in this embodiment as well, the axial stress from the stationary member 150 to the oscillation system 160 is reduced.

Furthermore, since the second torsion spring 14 is single, not in a pair, the size of the oscillating system 160 can be made small. Because of this reduction in size, the entire size of the optical instrument that uses this optical deflector can be made smaller and, moreover, the manufacturing cost can be reduced.

Particularly, in this embodiment, in addition to the AC current for driving the movable coil 18, a heating electric current for heating the resiliently supporting portions 12 and 14 is supplied and, on the basis of Joule heat generation of the coil 18, the temperatures of the resiliently supporting portions 12 and 14 can be adjusted. The heating electric current is AC and, by adjusting the amplitude, the temperature of the resiliently supporting portions 12 and 14 can be adjusted. As regards the frequency of the heating electric current, a frequency sufficiently higher than the two resonance frequencies of the oscillating system 160 is chosen intentionally. Because of this, the oscillating movable elements 11 and 13 can not follow the torque produced by this heating current, such that substantially they are not driven by that. Furthermore, as regards the frequency of the heating current, a frequency that does not correspond to the frequency of oscillation mode other than the natural oscillation mode about the torsional axis 17, is chosen.

The optical deflector of this embodiment has s driving circuit 156 for applying this heating current, in addition to the driving circuit for supplying a driving AC current to the movable coil 18. Here, if the heating current is DC, there would occur a tilt of the reflection surface 22 from the state in which it is not driven. If AC electric current is used, such tilt would not occur.

As described hereinbefore, in this embodiment as well, due to the cantilever structure of the oscillating system 160, any axial direction stress from the stationary member 150 is reduced. Thus, the change in torsional rigidity of the first and second torsion springs 12 and 14 is substantially only the change that follows the temperature change of the Young's modulus, such that they change approximately at the same changing rate. Further, as regards the two resonance frequencies of the oscillating system 160, they change with a temperature change approximately at the same changing rate. As a result of this, through temperature adjustment based on heating current to the movable coil 18, two resonance frequencies can be changed simultaneously at the same rate. Hence, the two resonance frequencies can be adjusted to a desired frequency easily. At the same time, since axial direction stress is reduced, even if the temperature of the oscillating system 160 is changed for the frequency adjustment, the flatness of the first oscillating movable element 11 having the reflection surface 22 formed thereon can be well maintained.

The movable coil 18 which is driving means functions also as a heating element, and therefore production of the optical deflector is easy and inexpensive. Furthermore, the process of producing a heating element such as heater wire can be omitted, and this reduces the cost of optical deflector production.

Since the movable coil 8 is able to directly heat the oscillation system 160, the power consumption for the heating is small and the time necessary for the temperature adjustment can be shortened. Hence, this embodiment is one preferable example that the driving means and the heating means are compatible each other.

In this embodiment, the second torsion spring 14 is single and, therefore, as seen from the movable coil 18 which is a heat source, the resistance to heat conductivity to the supporting member 15 is larger. Therefore, the first and second torsion springs 12 and 14 can be heated effectively. In addition to this, since the supporting member 15 can be made smaller as compared with a case where two second torsion springs 12 are used, the heat capacity is reduced further. Thus, the power consumption for the heating can be reduced, and the time for temperature adjustment can be shortened. Furthermore, the electrode pad 154 can be disposed closely by using a short wire, the size of the device can be made smaller.

In this embodiment as well, use of the cantilever structure enables smallness of the thermally contact area with the stationary member 150. Thus, the heat generation at the heating element can be used effectively for the temperature control of the torsion springs 12 and 14, without a large loss to the stationary member 150. Furthermore, the oscillating system 160 is made of monocrystal silicon, and it is very good in heat conductivity. Hence, through the heat generation of the movable coil 18, uniform temperature rise of the oscillating system 160 can be accomplished easily. It should be noted here that the coil 18 that functions also as a temperature adjusting element can be controlled essentially in the same manner as has been described with reference to the preceding embodiments.

Embodiment 4

Figure 8A:
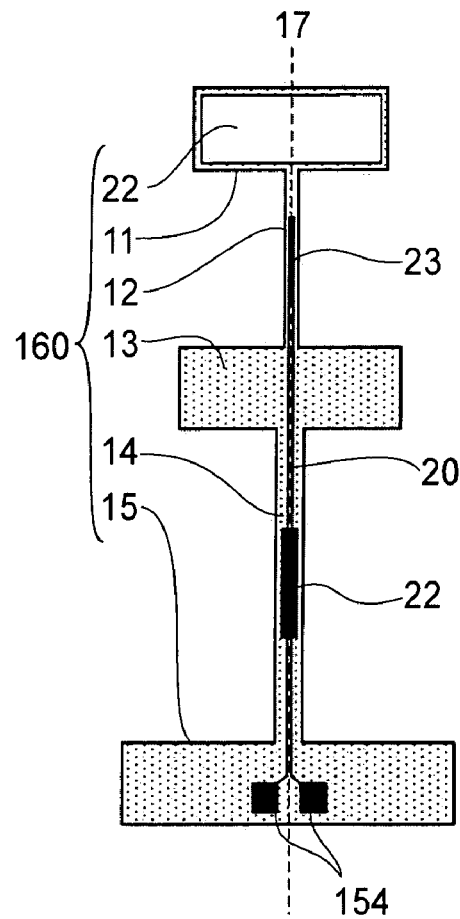
FIGS. 8A and 8B are top plan views, respectively, of an optical deflector according to a fourth embodiment of the present invention.
Figure 8B:
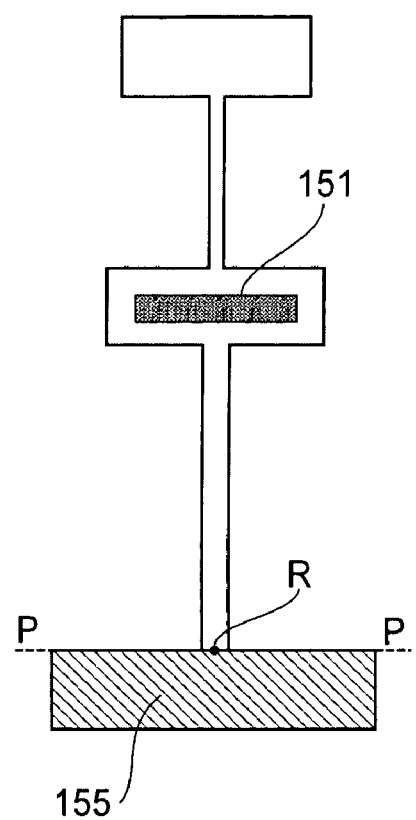
Figure 9:
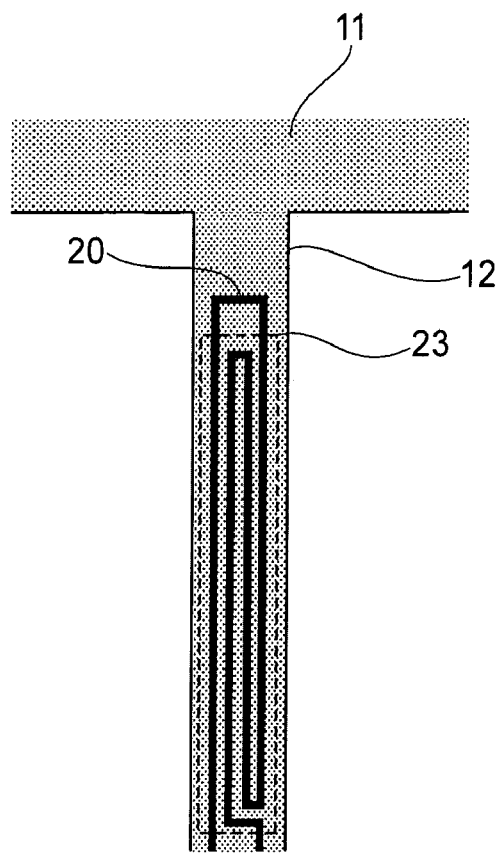
FIG. 9 is an enlarged view of a portion of the optical deflector according the fourth embodiment of the present invention, near the torsional axis 17 thereof.

FIGS. 8A, 8B and 9 are top plan views, respectively, for explaining an optical deflector according to a fourth embodiment of the present invention. In these drawings, the components having similar functions as of those of the third embodiment are denoted by like numerals, and explanation therefor will be omitted. Only distinctive features of this embodiment will be described in greater detail.

Like the third embodiment, the oscillating system 160 of this embodiment has two natural oscillation modes having a frequency ratio of 1:2. However, as compared with the third embodiment, each of the first and second torsion springs 12 and 14 is provided by a single spring member.

As compared with the third embodiment, the heater wire 20 is disposed as illustrated. More specifically, the heater wire 20 is disposed to extend through the electrode pads 154, the first torsion spring 12, the second oscillating movable element 13, and the first torsion spring 12. Particularly, as shown in FIG. 8A, the heater wire 20 is disposed with meanders near the central portions in the lengthwise direction of the first and second torsion springs 12 and 14, such that a first meander portion 22 and a second meander portion 23 are defined there.

FIG. 9 is a top plan view showing, with enlargement, the first meander portion 22 on the first torsion spring 12. As illustrated, the heater wire 20 extends with meanders.

The function and operation of the heater wire 20 of this embodiment are basically the same as of the third embodiment. However, in this embodiment, since each of the first and second torsion springs 12 and 14 is provided by a single spring element, as compared with a case of paired spring elements, the temperature can be made uniform by a small heat amount and in a short time and, therefore, the resonance frequencies can be adjusted satisfactorily.

In this embodiment, the meander portion is defined only about the central portion of the torsion spring, and no heater is provided in the vicinity of the root where stress is easily concentrated during the driving. This effectively avoids breakage of the heater wire 20 or breakage of the torsion spring.

Embodiment 5

Figure 10:
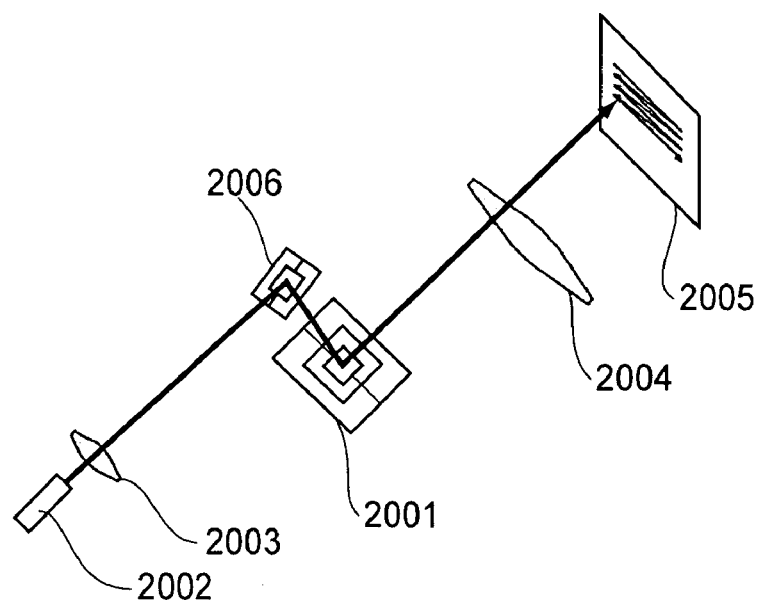
FIG. 10 is a schematic and perspective view, showing an optical instrument according to a fifth embodiment of the present invention, wherein the instrument uses an optical deflector of the present invention.

FIG. 10 is a schematic and perspective view of an embodiment of optical instrument wherein an optical deflector of the present invention is used. In this example, the optical instrument is an image display apparatus. In FIG. 10, denoted at 2001 is an optical deflector for longitudinal scan which serves to deflectively scan input light at a projection surface 2005, in vertical direction. On the other hand, denoted at 2006 is an optical deflector according to the present invention and, in this embodiment, it serves to deflectively scan the input light in a horizontal direction. Thus, the optical deflector group (2001, 2006) function to deflectively scan the input light on the projection surface 2005, in raster-scan fashion. Denoted at 2002 is a laser light source, and denoted at 2003, is a lens or a lens group. Denoted at 2004 is a writing lens or lens group. The laser light emitted from the laser light source 2002 has been intensity-modulated in a predetermined manner in association with the timing of optical scan, and it is scanned two-dimensionally by means of the optical deflector group (2001, 2006). The laser light thus scanned is projected by the writing lens 2004 to form an image on the projection plane 2005.

With the use of an optical deflector of the present invention for deflective scan of the projection surface 2005 in the horizontal direction, although it is a compact and low power consumption optical deflector based on resonance, the light can be deflectively scanned horizontally at approximately constant angular speed within the range of specifications. Therefore, the quality of images upon the projection surface 2005 is improved significantly.

Furthermore, if an optical deflector according to the present invention is used also for the vertical-scanning optical deflector 2001, the line spacings of horizontal lines of the image to be formed can be made substantially constant. Thus, non-uniformness in brightness or luminance of the image is reduced, and the overall size of the image in the vertical direction can be made constant.

With the use of an optical deflector of the present invention, the frequency of natural oscillation mode of the optical deflector is less influenced by external factors such as temperature, and stable image display is assured.

Embodiment 6

Figure 11:
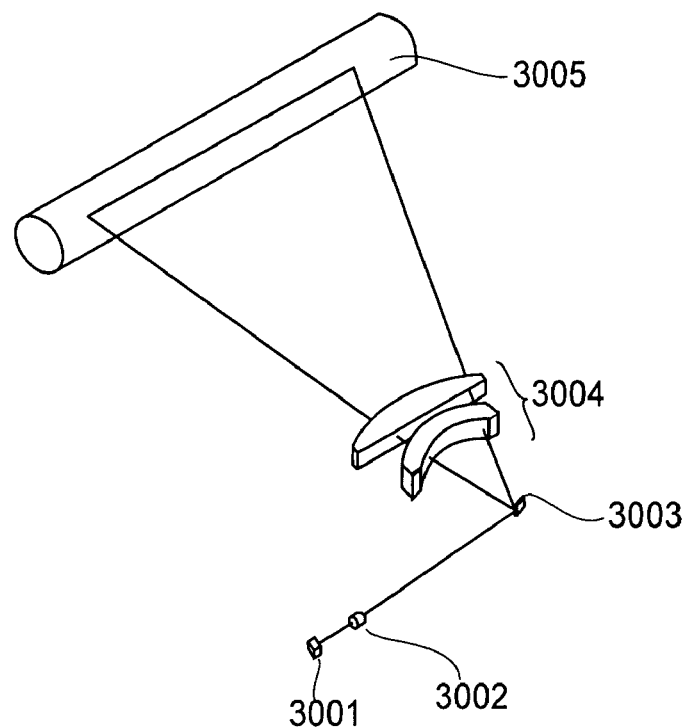
FIG. 11 is a schematic and perspective view, showing an optical instrument according to a sixth embodiment of the present invention, wherein the instrument uses an optical deflector of the present invention.

FIG. 11 is a schematic and perspective view, showing another embodiment of optical instrument that uses an optical deflector of the present invention. In this example, the optical instrument is an image forming apparatus. In FIG. 11, denoted at 3003 is an optical deflector of the present invention, and it serves to deflectively scan input light one-dimensionally. Denoted at 3001 is a laser light source, and denoted at 3002 is a lens or a lens group. Denoted at 3004 is a writing lens or lens group, and denoted at 3005 is a photosensitive member of drum-like shape.

The laser light emitted from the laser light source 3001 has been intensity-modulated in a predetermined manner in association with the timing of optical scan. The intensity-modulated laser light goes through the lens group 3002 and, by means of the optical scanning system (optical deflector) 3003, it is scanned one-dimensionally. The laser light thus scanned is then projected by the writing lens or lens group 3004, whereby an image is formed on the photosensitive member 3005.

The photosensitive member 3005 is rotated about a rotational axis and in a direction perpendicular to the scan direction, and it is electrically charged uniformly by means of a charging device, not shown. By scanning the photosensitive drum with light, an electrostatic latent image is formed in the portion scanned by the light. Subsequently, the electrostatic latent image is developed into a toner image by a developing device, not shown. The toner image is then transferred to a paper transfer sheet, not shown, and then it is fixed, whereby an image is produced on the paper sheet.

With the use of the optical deflector 3003 of the present invention, the angular speed of the deflective scan of light can be made approximately constant within the range of specifications. Furthermore, with the use of the optical deflector 3003 of the present invention, stable image formation less influenced by external factors such as temperature is assured.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2005-337074 filed Nov. 22, 2005, for which is hereby incorporated by reference.

What is claimed is:

1. An oscillating device, comprising:
   an oscillating system having a plurality of oscillation movable elements, a plurality of resiliently supporting portions connected to said plurality of oscillation movable elements, and a supporting member for supporting a portion of said plurality of resiliently supporting portions;
   a coil for applying a torque to at least one of said plurality of oscillation movable elements;
   a driving circuit for supplying a driving signal to said coil; and
   a temperature adjusting element for adjusting temperatures of said plurality of resiliently supporting portions;
   wherein said oscillating system has a reference oscillation mode corresponding to a natural oscillation mode at a reference frequency, and a second natural oscillation mode of a frequency n-fold of the reference frequency, where n is an integer;
   wherein said driving circuit applies, to said coil, a driving signal of the reference oscillation mode and a driving signal of the second natural oscillation mode so as to excite the reference oscillation mode and the second natural oscillation mode simultaneously, and
   wherein said temperature adjusting element is configured to adjust the temperatures of said plurality of resiliently supporting portions, independently of each other.

2. An oscillating device according to claim 1, further comprising control means for controlling said temperature adjusting element to adjust the frequency of the natural oscillation mode.

3. An oscillating device according to claim 1, wherein said temperature adjusting element is provided in a portion of said resiliently supporting portions.

4. An oscillating device according to claim 3, wherein said temperature adjusting element is disposed with a meander.

5. An oscillating device according to claim 1, wherein said supporting member has a cantilever structure and is provided on said stationary member.

6. An oscillating device according to claim 1, wherein said supporting member is supported at its opposite ends and is provided on said stationary member, wherein said temperature adjusting element is provided on said resiliently supporting portions, and wherein said stationary member is provided with a second temperature adjusting element, separate from the first-mentioned temperature adjusting element, configured to adjust a length of said stationary member in a direction parallel to a torsional axis.

7. An oscillating device according to claim 1, wherein said oscillating system includes a first oscillation movable element, a second oscillation movable element, a first resiliently supporting portions, a second resiliently supporting portions, and a supporting member, wherein said first oscillation movable element is resiliently supported relative to said second oscillation movable element by said first resiliently supporting portion, for oscillation about the predetermined oscillation axis, and wherein said second oscillation movable element is resiliently supported relative to said supporting member by said second resiliently supporting portion, for oscillation about the predetermined oscillation axis.

8. An oscillating device according to claim 7, wherein said temperature adjusting element comprises a first heating element and a second heating element, and wherein said first heating element is configured to heat said first resiliently supporting portion and said second resiliently supporting portion wile said second heating element is configured to heat said second resiliently supporting portion.

9. An oscillating device according to claim 1, wherein said temperature adjusting element comprises a heating element provided by a resistance heat generating member configured to generate heat in response to energization.

10. An oscillating device according to claim 1, wherein said oscillating system has natural oscillation modes of two different frequencies, and wherein one of the two frequencies is approximately twofold or threefold of the other frequency.

11. An oscillating device according to claim 1, wherein said oscillation movable element, said resiliently supporting portions and said supporting member are made integrally from monocrystal silicon.

12. An oscillating device according to claim 1, wherein said oscillation movable element has a reflection surface and it functions as an optical deflector for changing a direction of reflection of light incident thereupon.

13. An optical instrument, comprising:
   a light source; and
   an oscillating device as recited in claim 12, for deflecting light from said light source;
   wherein at least a portion of the light deflected by said oscillating device is projected on an image display member or a photosensitive member

* * * * *